United States Patent
Nakano et al.

(10) Patent No.: US 12,377,725 B2
(45) Date of Patent: Aug. 5, 2025

(54) VEHICLE

(71) Applicant: HONDA MOTOR CO., LTD., Tokyo (JP)

(72) Inventors: Junichi Nakano, Tokyo (JP); Junji Higashiyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 18/119,410

(22) Filed: Mar. 9, 2023

(65) Prior Publication Data
US 2023/0311639 A1    Oct. 5, 2023

(30) Foreign Application Priority Data
Mar. 31, 2022    (JP) .................................. 2022-060939

(51) Int. Cl.
| | |
|---|---|
| B60K 13/04 | (2006.01) |
| B60K 5/00 | (2006.01) |
| B62D 21/09 | (2006.01) |
| F01N 13/10 | (2010.01) |
| F01N 13/18 | (2010.01) |
| B60N 2/005 | (2006.01) |
| B62D 33/02 | (2006.01) |

(52) U.S. Cl.
CPC ............ *B60K 13/04* (2013.01); *B60K 5/00* (2013.01); *B62D 21/09* (2013.01); *F01N 13/10* (2013.01); *F01N 13/1805* (2013.01); *B60N 2/005* (2013.01); *B62D 33/02* (2013.01)

(58) Field of Classification Search
CPC ......... B60K 13/04; B60K 13/02; B60K 5/00; B60K 20/06; B60K 35/50; B62D 21/09; B62D 33/02; F01N 13/10; F01N 13/1805; B60N 2/005
USPC ....................................... 180/296, 68.3, 233
See application file for complete search history.

(56) References Cited

U.S. PATENT DOCUMENTS

| | | | |
|---|---|---|---|
| 11,092,229 B2 | 8/2021 | Matsudo | |
| 2022/0042434 A1* | 2/2022 | Tajima | .................... F16H 9/18 |
| 2022/0355877 A1* | 11/2022 | Jyouzaki | ................ B60K 17/00 |

FOREIGN PATENT DOCUMENTS

JP    2020-108976 A    7/2020

* cited by examiner

*Primary Examiner* — Mark A Laurenzi
*Assistant Examiner* — Kelsey L Stanek
(74) *Attorney, Agent, or Firm* — Carrier, Shende & Associated P.C.; Joseph P. Carrier; Jeffrey T. Gedeon

(57) ABSTRACT

A vehicle includes an internal combustion engine; an engine body at least partially located at a center in a vehicle width direction; a first chamber provided in an exhaust passage extending from the engine body; and a second chamber provided downstream of the first chamber in the exhaust passage, in which the first chamber and the second chamber are each located behind the engine body, and at least a part of the first chamber and at least a part of the second chamber overlap the engine body in a vehicle width direction and a height direction, respectively. This vehicle structure can contribute to downsizing of an exhaust system of an internal combustion engine in a vehicle including a vehicle frequently used to travel on an uneven ground.

6 Claims, 12 Drawing Sheets

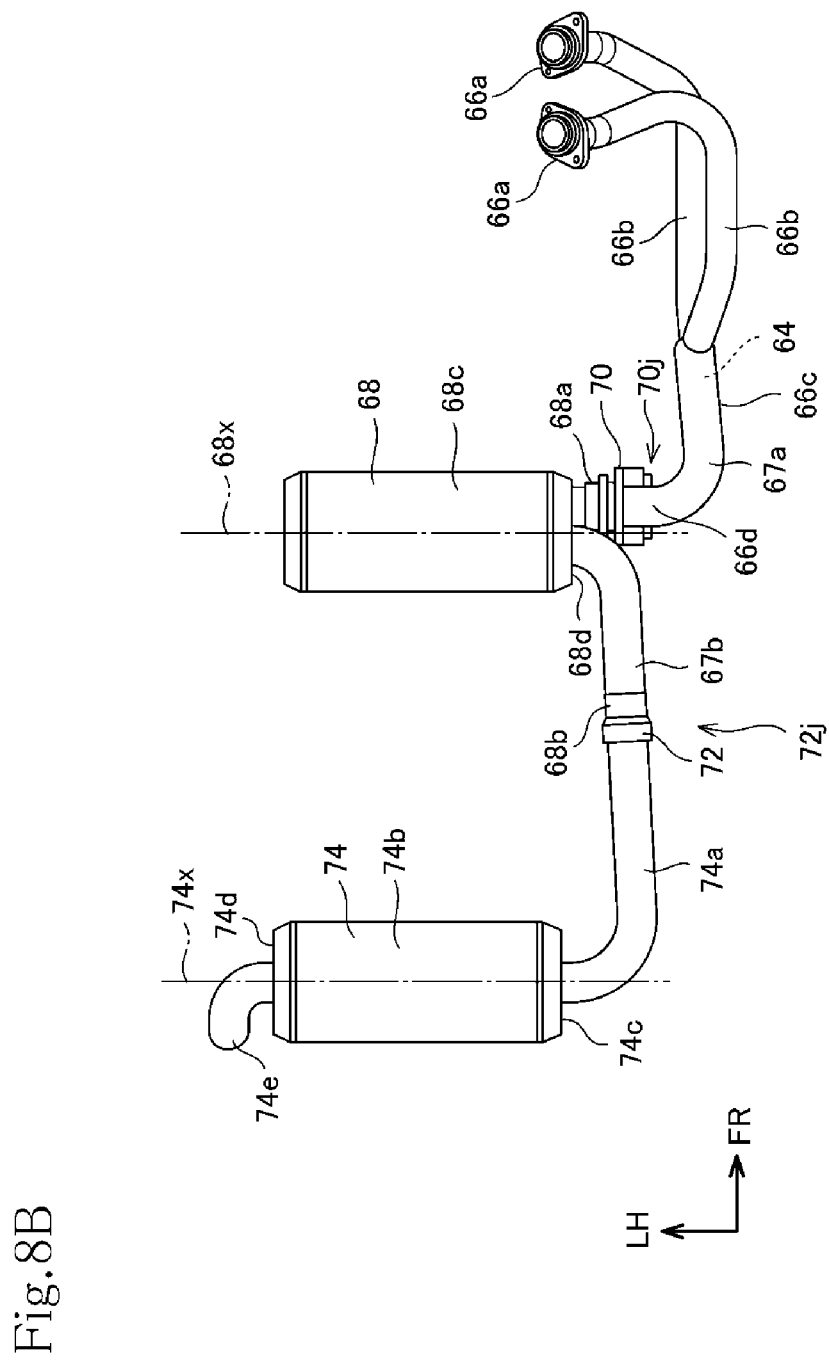

VEHICLE

TECHNICAL FIELD

The present invention relates to a vehicle having three or more wheels including a front wheel and a rear wheel, and relates to a vehicle capable of traveling on an uneven ground such as a multi-utility vehicle (MUV) used even in a large inclined state, for example.

BACKGROUND ART

Patent Document 1 discloses an example of a vehicle that is called an all-terrain vehicle (ATV), a side-by-side vehicle, or the like and is frequently used on an uneven ground. The vehicle of Patent Document 1 has left and right front wheels and left and right rear wheels, and has left and right front seats and left and right rear seats. A dashboard is disposed in front of the front seats, and an area covered with the front cover in front of the dashboard is defined as a front area. An engine of an engine unit is disposed near a center of a vehicle body in a front-rear direction, and an intake duct connected to a cylinder portion of the engine is connected to an air cleaner. The intake duct includes a first pipe portion extending in the front-rear direction and a second pipe portion connected to a front portion of the first pipe portion and extending in the vertical direction, whereby the air cleaner is disposed in the front area. The air cleaner has an intake port for taking in outside air at an upper portion thereof, and the intake port is opened to the right. By opening the intake port in the direction orthogonal to the traveling direction of the vehicle in this manner, the possibility of drawing dust or the like from the intake port during traveling of the vehicle is reduced.

PRIOR ART DOCUMENT

Patent Document

Patent Document 1: JP 2020-108976 A

SUMMARY OF THE INVENTION

Underlying Problems to be Solved by the Invention

Meanwhile, in a vehicle capable of traveling on an uneven ground such as a multi-utility vehicle (MUV), for example, there is a demand for a more compact arrangement of an internal combustion engine in order to further widen a space for an occupant and the like. For example, an exhaust system of an internal combustion engine includes an exhaust gas purification device and a silencer, and further proposals of arrangement configurations of these exhaust system devices are expected.

An object of the present invention is to provide a novel arrangement that can contribute to downsizing of an exhaust system of an internal combustion engine in a vehicle including a vehicle frequently used on an uneven ground.

Means to Solve the Problems

In order to achieve the above object, one aspect of the present invention is a vehicle that has an internal combustion engine, the vehicle including:
an engine body at least partially located at a center in a vehicle width direction;
a first chamber provided in an exhaust passage extending from the engine body; and
a second chamber provided downstream of the first chamber in the exhaust passage,
in which
the first chamber and the second chamber are each located behind the engine body, and
at least a part of the first chamber and at least a part of the second chamber overlap the engine body in a vehicle width direction and a height direction, respectively.

With the above configuration, the arrangement area of the first chamber and the second chamber can be limited to the area behind the engine body and at least partially hidden by the engine body, and for example, it is possible to prevent the length of both or one of the exhaust pipe extending between the engine body and the first chamber and the exhaust pipe extending between the first chamber and the second chamber from becoming unnecessarily long, and thus it is possible to arrange the exhaust system of the internal combustion engine compactly.

Preferably, the first chamber is disposed to be biased to one side in the vehicle width direction, and the second chamber is disposed to be biased to the same side as the side where the first chamber is biased in the vehicle width direction. With this configuration, the first chamber and the second chamber can be biased in the same direction in the vehicle width direction, so that the chambers, which may generally have a large capacity, can be compactly disposed in the vehicle.

Preferably, a seat is provided in front of the engine body, a cargo bed is provided behind the engine body, and the first chamber and the second chamber are disposed below an upper end portion of a rear frame portion of a vehicle body frame, the upper end portion supporting the cargo bed. With this configuration, the exhaust system of the internal combustion engine can be disposed substantially compactly below the cargo bed. In addition, the exhaust gas of the internal combustion engine has a high temperature, and the exhaust system is likely to have a high temperature. By disposing the chambers under the cargo bed in this manner, it is possible to suppress the occupant sitting on the seat from being affected by the heat of the exhaust system.

Preferably, an exhaust pipe extending between the engine body and the first chamber and an exhaust pipe extending between the first chamber and the second chamber extend on the same side in the vehicle width direction. With this configuration, the exhaust pipe extending between the engine body and the first chamber and the exhaust pipe extending between the first chamber and the second chamber can be made compact in at least one of the length and the arrangement space.

Preferably, an exhaust pipe extending between the engine body and the first chamber has at least one joint portion, and an exhaust pipe extending between the first chamber and the second chamber has at least one joint portion. With this configuration, in the middle of each of the exhaust pipes, for example, a part of vibration transmitted from the engine body can be absorbed by the joint portions, whereby generation of abnormal noise from the exhaust system can be prevented and durability of the exhaust system component can be improved.

Preferably, joint portions of different types are provided in an exhaust pipe extending between the engine body and the first chamber and an exhaust pipe extending between the first chamber and the second chamber. With this configuration, the different types of joint portions can be provided and vibration transmitted from the engine body to each exhaust pipe is easily absorbed so that it is possible to prevent generation of abnormal noise and enhance durability of each exhaust system component.

Effects of the Invention

According to the above aspect of the present invention, since the above configuration is provided, the exhaust system of the internal combustion engine can be compactly disposed in the vehicle.

BRIEF DESCRIPTION OF DRAWINGS

FIG. 8B is a view illustrating the exhaust device of the exhaust system of the internal combustion engine in the vehicle of FIG. 1, and is a top view of the exhaust device.

MODES FOR CARRYING OUT THE INVENTION

Hereinafter, an embodiment according to the present invention will be described with reference to the accompanying drawings. A same numeral is given to a same component (or configuration), and a name and a function thereof are the same. Therefore, detailed description thereof will not be repeated.

Figure 1:
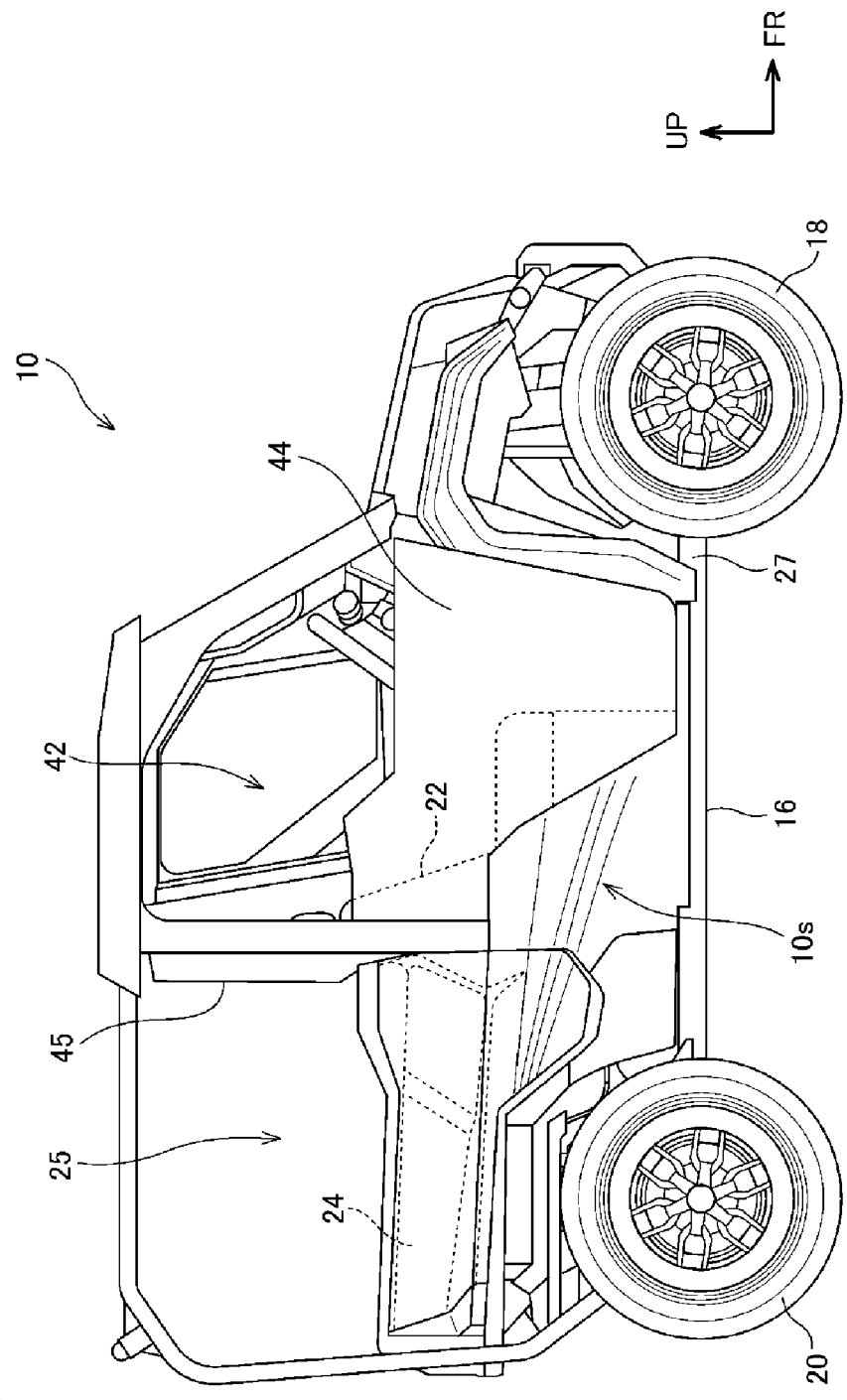
FIG. 1 is a right side view of a vehicle according to an embodiment of the present invention.
Figure 2:
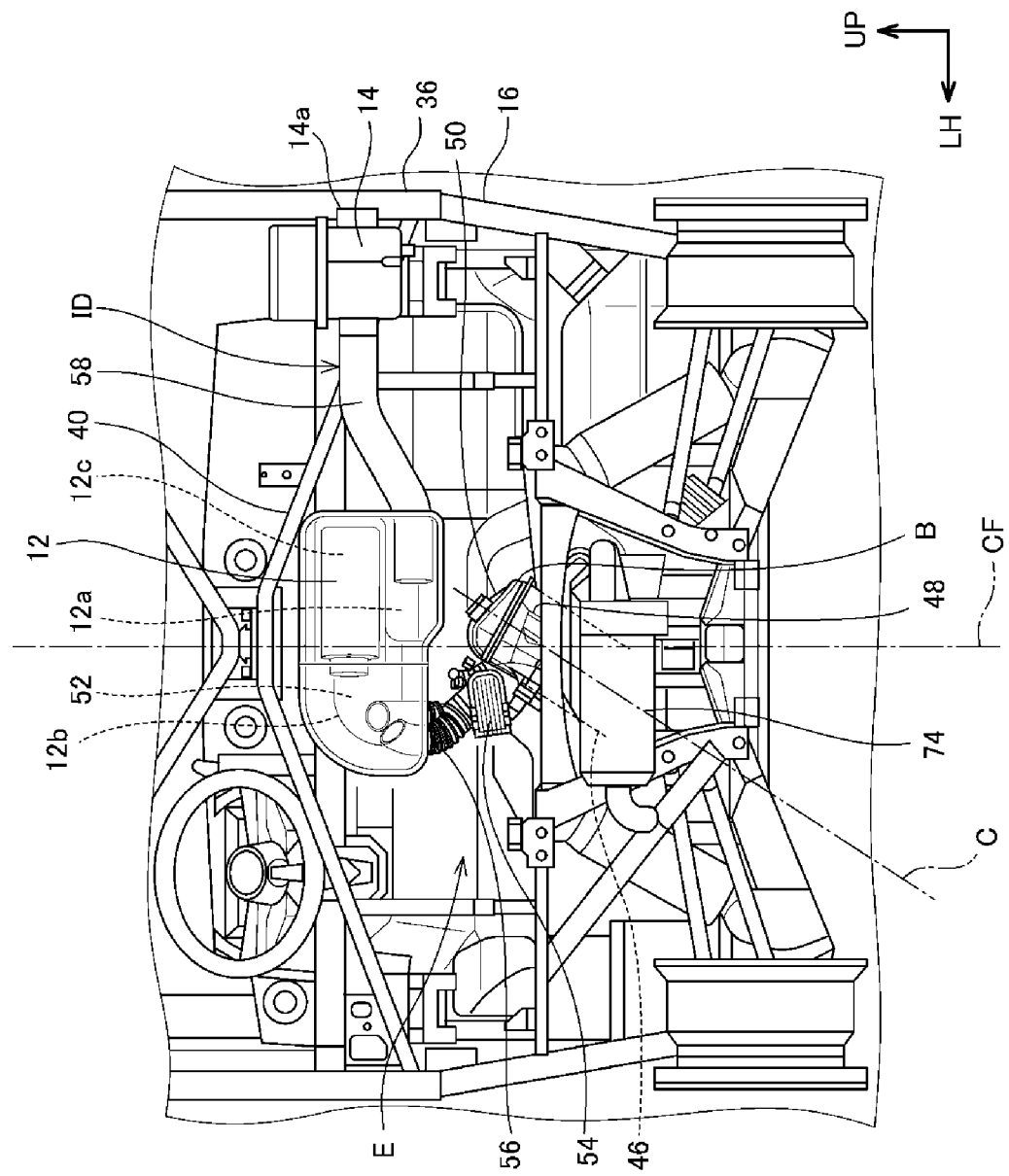
FIG. 2 is a rear view of a part of a vehicle body frame and an internal combustion engine in the vehicle of FIG. 1 as viewed from the rear of the vehicle, with various cover members removed.
Figure 3:
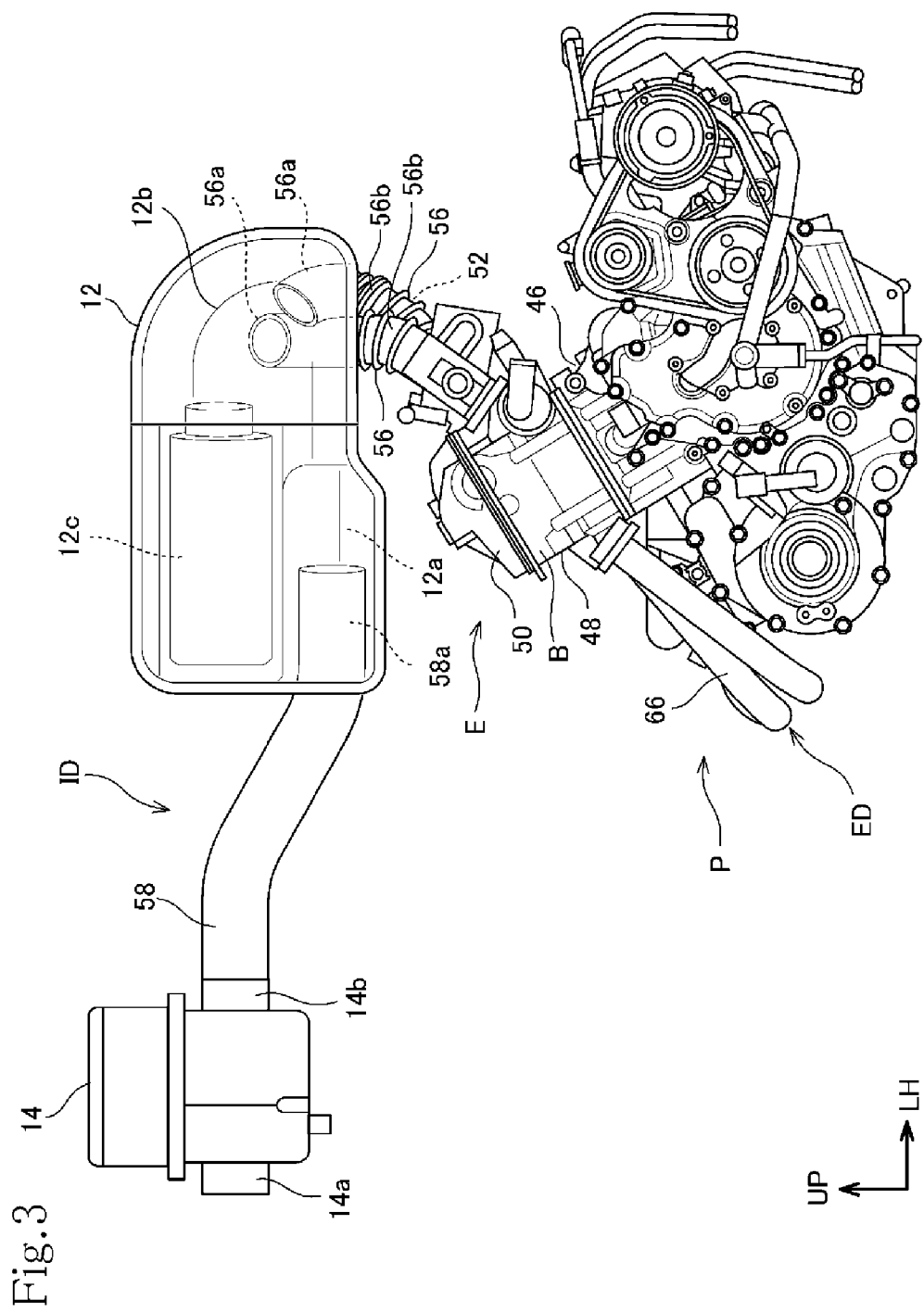
FIG. 3 is a front view of a power unit mounted on the vehicle in FIG. 1.
Figure 4:
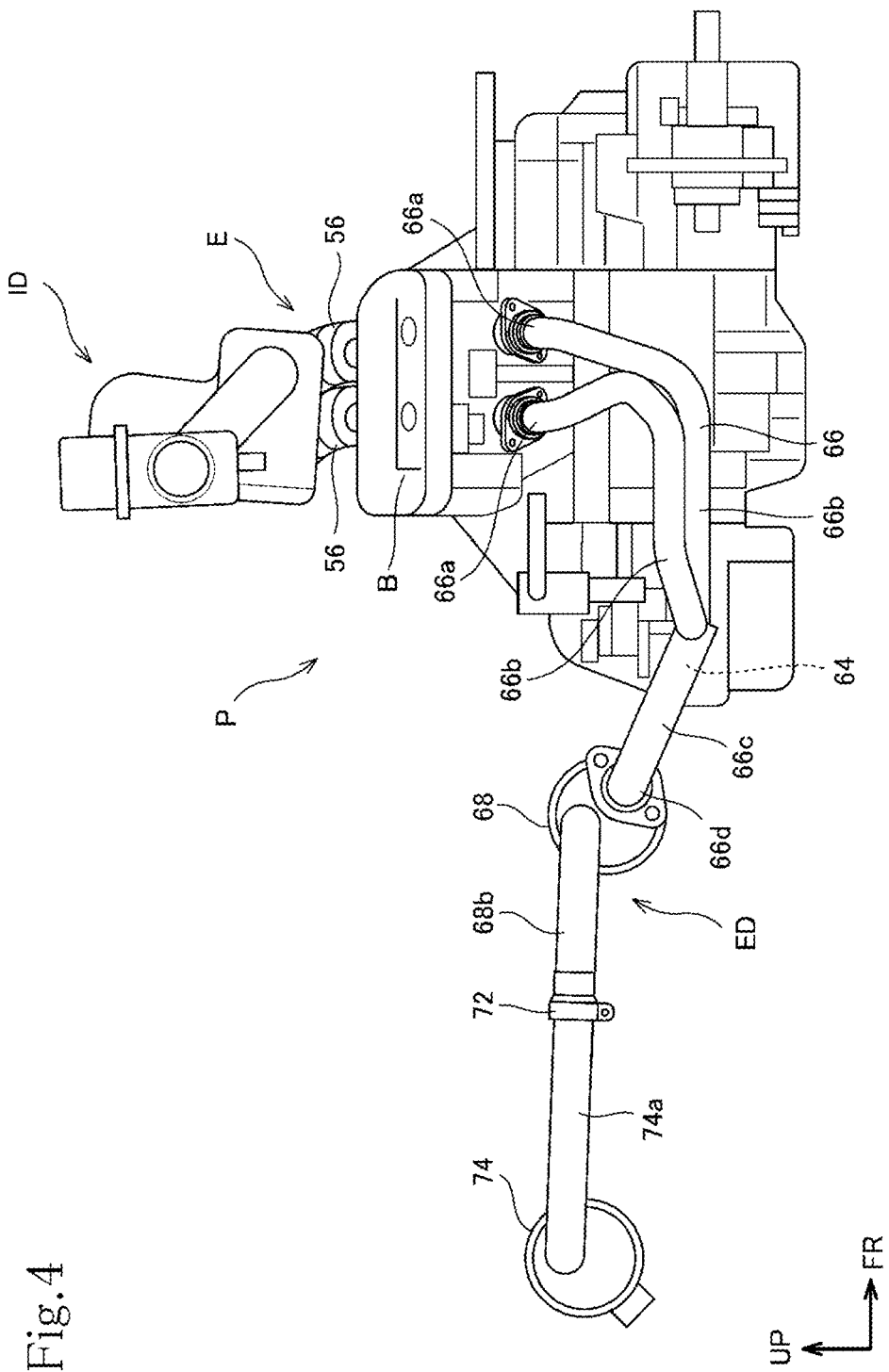
FIG. 4 is a right side view of the power unit of FIG. 3.
Figure 5:
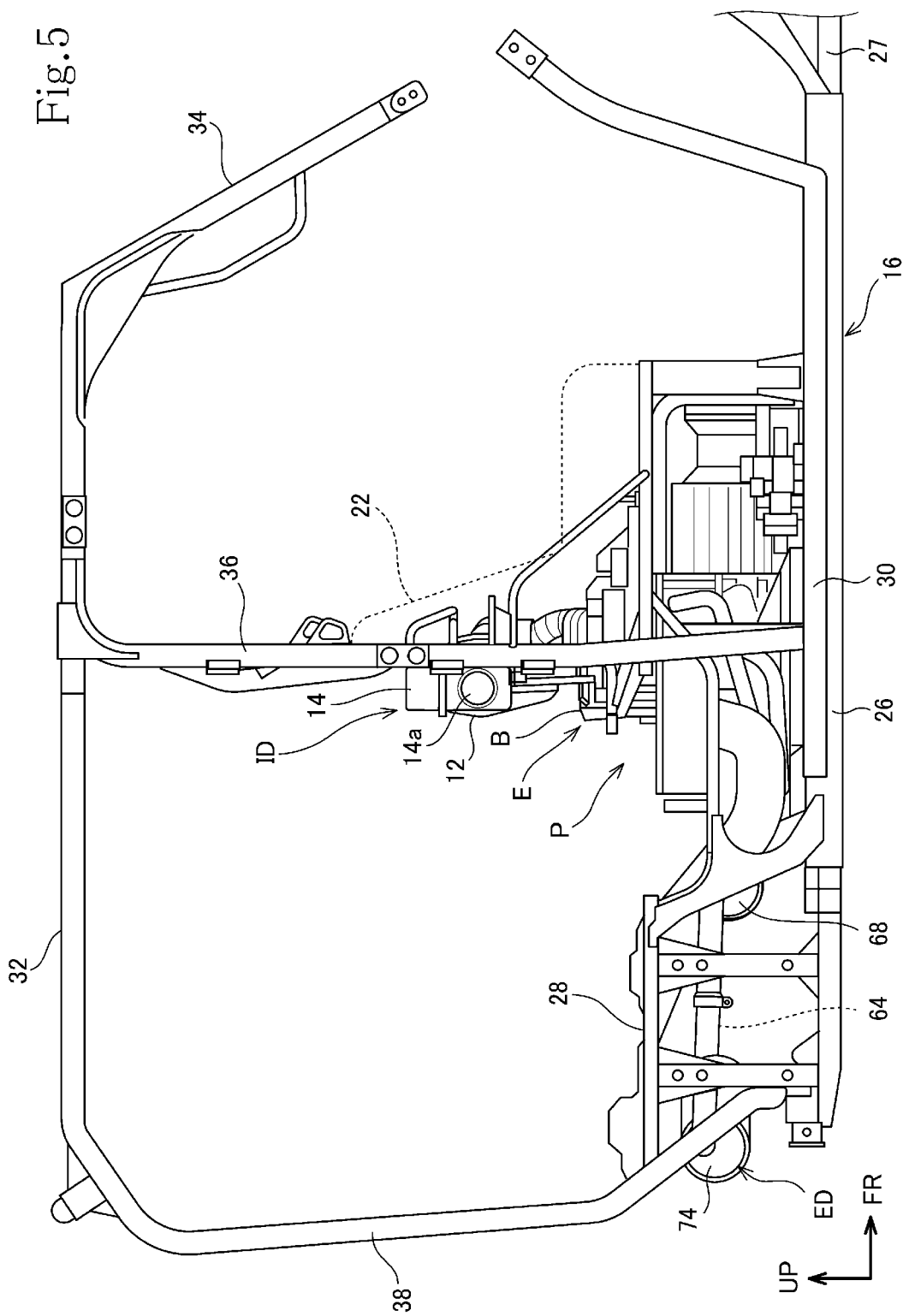
FIG. 5 is a right side view illustrating the power unit mounted on the vehicle body frame in the vehicle of FIG. 1.
Figure 6:
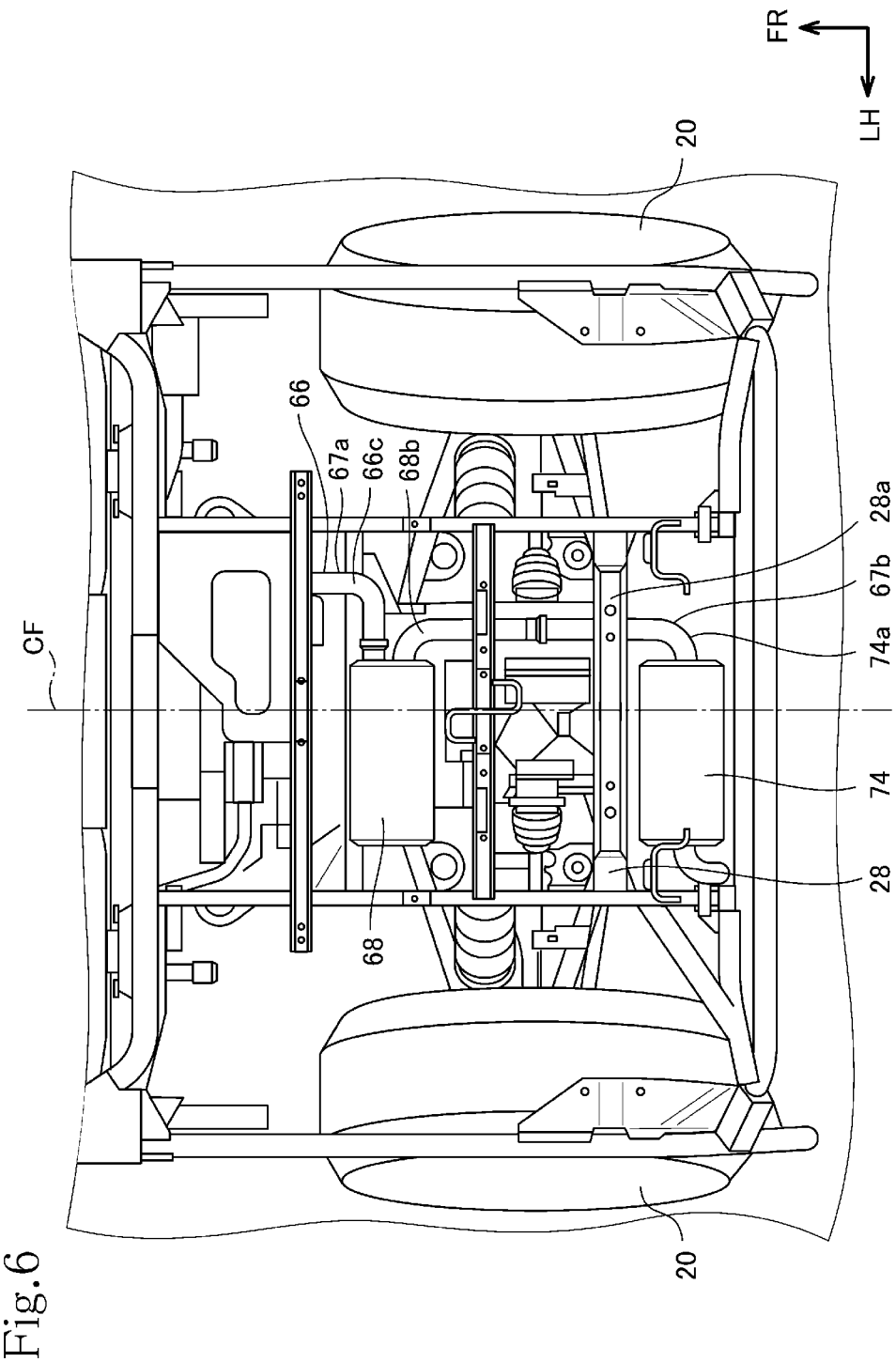
FIG. 6 is a top view illustrating a rear frame portion of the vehicle body frame and an exhaust system of the internal combustion engine in the vehicle of FIG. 1.
Figure 7:
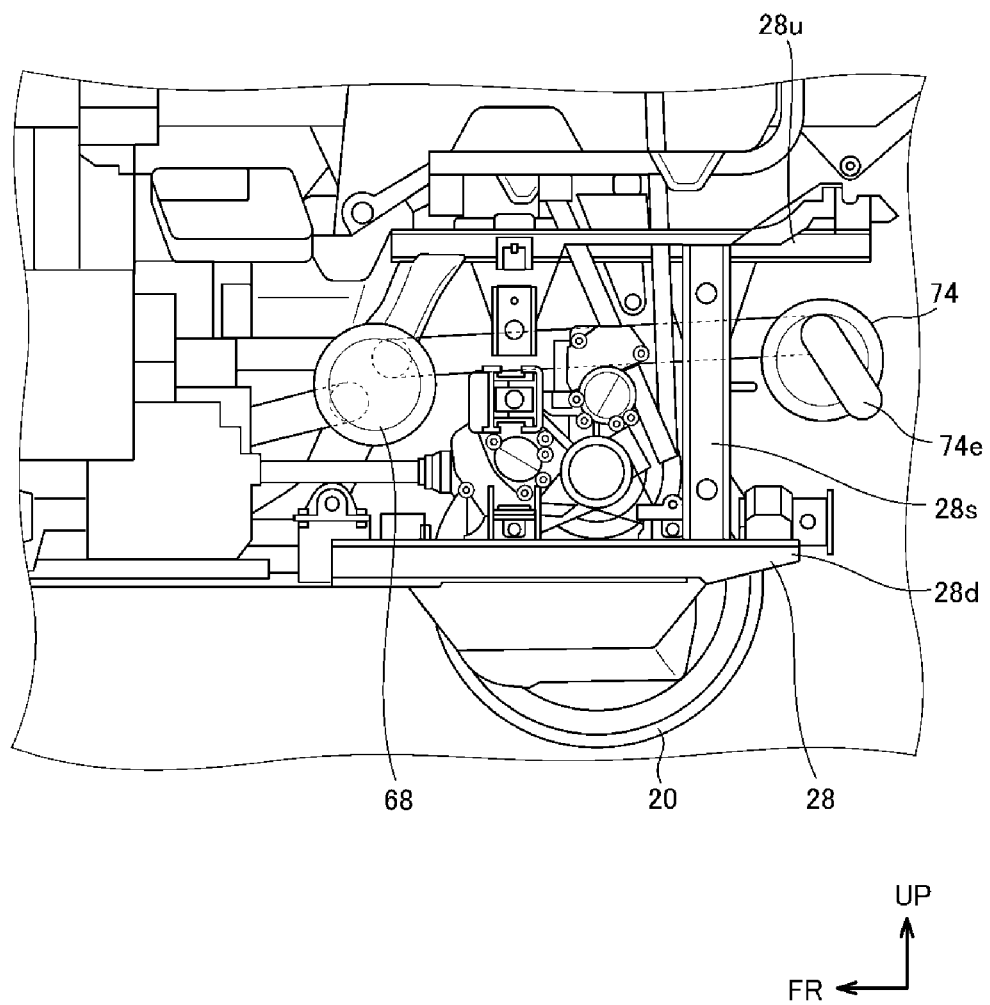
FIG. 7 is a left side view illustrating the rear frame portion of the vehicle body frame and the exhaust system of the internal combustion engine in the vehicle of FIG. 1.
Figure 8A:
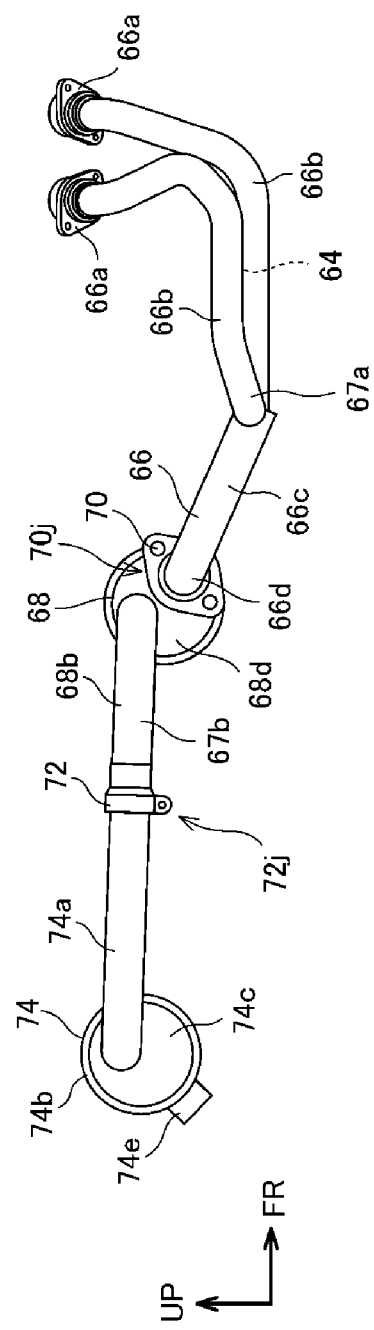
FIG. 8A is a view illustrating an exhaust device of the exhaust system of the internal combustion engine in the vehicle of FIG. 1, and is a right side view of the exhaust device.
Figure 9:
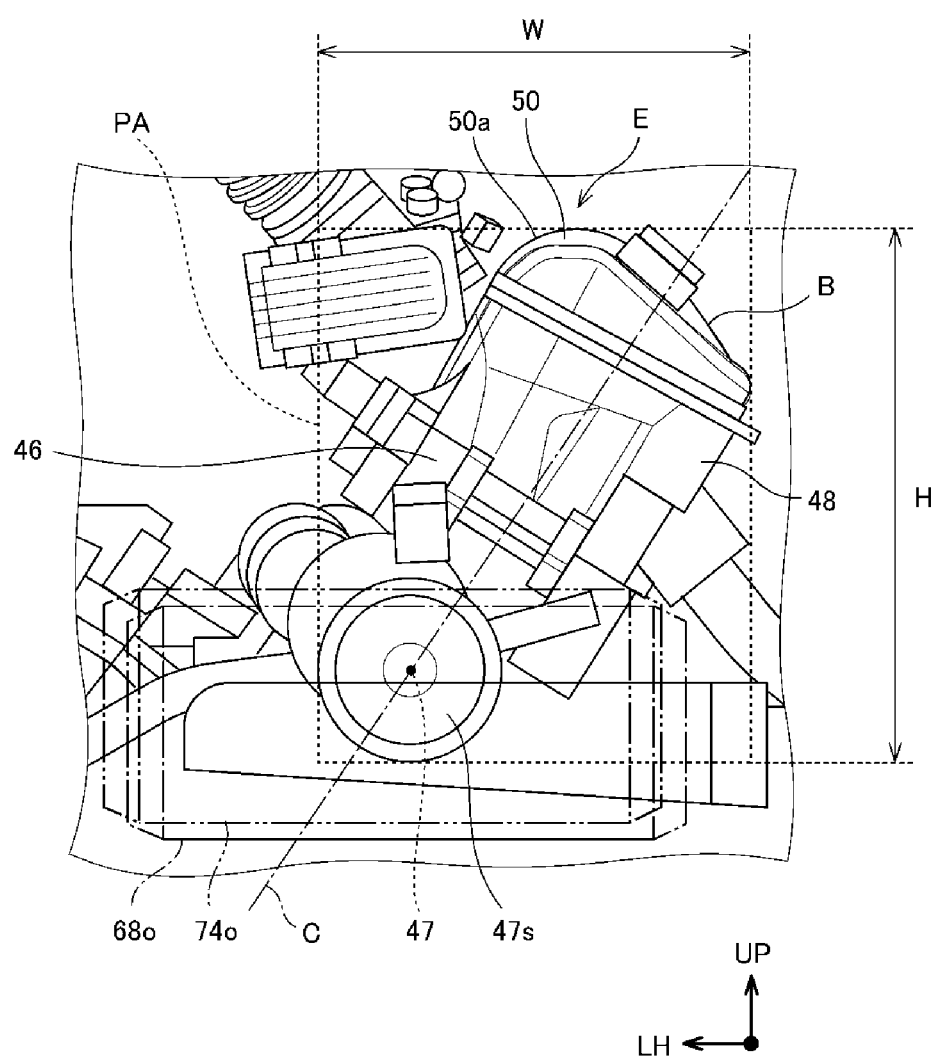
FIG. 9 is a diagram illustrating an arrangement relationship between the engine body of the internal combustion engine and chambers of the exhaust device in the vehicle of FIG. 1.

A vehicle 10 according to an embodiment will be described with reference to FIGS. 1 to 9. FIG. 1 is a right side view of the vehicle 10 as viewed from the right side, FIG. 2 is a rear view of a part of a vehicle body frame (hereinafter, a frame) 16 and an internal combustion engine E as viewed from the rear of the vehicle without various cover members, FIG. 3 is a front view of a power unit P mounted on the vehicle 10, FIG. 4 is a right side view of the power unit P, FIG. 5 is a right side view illustrating the power unit P mounted on the frame 16, FIG. 6 is a top view illustrating a rear frame portion 28 of the frame 16 and an exhaust system of the internal combustion engine E in the vehicle 10, FIG. 7 is a left side view illustrating the rear frame portion 28 of the frame 16 and the exhaust system of the internal combustion engine E in the vehicle 10, FIG. 8A is a view illustrating an exhaust device ED of the exhaust system of the internal combustion engine E, and is a right side view of the exhaust device ED, FIG. 8B is a top view of the exhaust device ED, and FIG. 9 is a diagram illustrating an arrangement relationship between an engine body B of the internal combustion engine E and the chambers 68 and 74 of the exhaust device ED. In the following description and each drawing, the front-rear direction, the left-right direction, and the up-down direction are defined from the viewpoint of the driver who is in the vehicle 10, a sign "FR" is used on the front side in the front-rear direction, a sign "LH" is used on the left side in the left-right direction, that is, the vehicle width direction, and a sign "UP" is used on the upper side in the up-down direction, that is, the height direction. The directions in FIGS. 3, 4, 8A, and 8B conform to the arrangement when the power unit P or the exhaust device ED is mounted on the vehicle 10.

The vehicle 10 includes the frame 16 serving as a framework of the vehicle 10, a pair of left and right front wheels 18 supported at a front portion of the frame 16, and a pair of left and right rear wheels 20 supported at a rear portion of the frame 16. The vehicle 10 is a so-called rough terrain vehicle, and is a multi-utility vehicle (MUV) that travels by supplying a driving force to the front wheels 18 and the rear wheels 20 by the operation of the engine body B of the internal combustion engine E disposed in the vicinity of the center of the vehicle body in the front-rear direction and in the lower portion as illustrated in FIGS. 2 and 5, for example. In the vehicle 10, two occupants including a driver can sit on front seats 22 side by side in the vehicle width direction. A cargo bed 24 is provided on the rear side of the vehicle 10. Note that the cargo bed 24 is an example of utilization of an accommodation portion 25 provided behind the seats 22, and for example, a seat on which an occupant sits may be provided instead of the cargo bed 24.

As illustrated in FIG. 5, the frame 16 includes a center frame portion (main frame portion) 26 connected to the rear part of a front frame portion 27, and a rear frame portion 28 connected to the rear part of the center frame portion 26. The frame 16 includes a pair of left and right side frame portions attached to a side portions of the center frame portion 26, and an upper frame portion 32 attached so as to extend upward from the front frame portion 27, the side frame portion 30, and the rear frame portion 28. The front frame portion 27 supports the front wheels 18 via a front suspension. The rear frame portion 28 supports the rear wheels 20 via a rear suspension.

The upper frame portion 32 includes a pair of left and right front pillars 34 extending obliquely upward and rearward from the rear upper portion of the front frame portion 27, a pair of left and right center pillars 36 extending upward from the central portion in the front-rear direction of the side frame portion 30, and a pair of left and right rear pillars 38 extending upward from the rear end of the rear frame portion 28. A cross pipe 40 is disposed between the left and right center pillars 36, and the center pillars 36 are connected to each other by the cross pipe 40. The cross pipe 40 is a frame member made of a roll bar, that is, a roll bar portion, and is an example of a reinforcing frame portion. A space surrounded by the front frame portion 27, the side frame portion 30, the center pillar 36, and the upper frame portion 32 forms a cabin 42 in which occupants ride. As illustrated in FIG. 1, the seats 22 are disposed in the cabin 42.

In the cabin 42, the seats 22 are disposed between the front pillar 34 and the center pillar 36, and a pair of left and right front doors 44 opened and closed by a hinge mechanism on the front side is provided. Also in FIG. 5, the seats 22 are indicated by a broken line. In addition, a rear cover 45 is provided so as to partition immediately behind the seats 22 of the cabin 42, that is, the rear of the cabin 42.

The rear cover 45 is positioned immediately behind the cross pipe 40 in the front-rear direction, and extends in a planar shape in the vehicle width direction and the vertical direction. The above-described cargo bed 24 is provided on the rear side of the rear cover 45. The cargo bed 24 includes a hinge mechanism on the rear side, and is configured to be able to rise upward around the hinge mechanism.

In the vehicle 10, the power unit P is mounted on the frame 16. The power unit P includes a water-cooled four-stroke cycle internal combustion engine E having two parallel cylinders and a transmission having a transmission shaft parallel to a crankshaft (FIG. 9 illustrates a crankshaft axis 47.) thereof. The driving force of the internal combustion engine E is transmitted to the front wheels 18 and the rear wheels 20 via the transmission as described above. According to the present embodiment, the internal combustion engine E, that is, the engine body B thereof is disposed on the frame 16 of the vehicle 10 such that the crankshaft, that is, the crankshaft axis 47 extends in the vehicle front-rear direction, but the present invention does not limit the arrangement of the engine body B to this manner.

The engine body B of the internal combustion engine E is disposed substantially at the center in the front-rear direction. As is clear from FIGS. 1 to 5, the engine body B is positioned behind the seats 22 on which an occupant such as a driver sits. The engine body B of the internal combustion engine E is provided at a position of the center frame portion 26, that is, at a position of the center pillar 36 in the front-rear direction, and at least a part of the engine body B overlaps the center pillar 36 in a side view (see FIG. 5). As illustrated in FIG. 2, when defining a center plane CF that passes through substantially the center of the vehicle 10 in the vehicle width direction, is orthogonal to the vehicle width direction, extends in the front-rear direction, and extends in the vertical direction, the center plane CF intersects with a cylinder head 48 of the engine body B of the internal combustion engine E. In other words, in the vehicle 10, at least a part of the engine body B is located behind the seat 22 on which the driver sits and at the center in the vehicle width direction. As illustrated in FIG. 2, the engine body B of the internal combustion engine E is vertically disposed such that a cylinder axis C of a cylinder bore of a cylinder block 46 is inclined rightward in the vehicle width direction but is substantially straight in the vehicle front-rear direction.

The engine body B includes the cylinder block 46 in which the cylinder bore is formed in an upper portion of a crankcase that pivotally supports the crankshaft, and the cylinder head 48 and a cylinder head cover 50 are sequentially stacked above the cylinder block 46. An intake system including air cleaners 12 and 14, which is an intake device ID, extends above the engine body B, and an exhaust system, that is, an exhaust device ED extends behind the engine body B. The engine body B is provided with its cylinder axis C inclined as described above, and the intake device ID is connected to the upper left portion of the cylinder head 48, and the exhaust device ED is connected to the lower right portion of the cylinder head 48.

In the intake device ID connected to the engine body B of the internal combustion engine E, the air cleaner 12 disposed relatively downstream (downstream in the intake flow direction) in the intake passage 52 connected to the engine body B is referred to as a first air cleaner, and the air cleaner 14 disposed upstream of the first air cleaner 12 is referred to as a second air cleaner. In this example, the first air cleaner 12 is larger than the second air cleaner 14, and the first air cleaner 12 may be simply referred to as an air cleaner, and the second air cleaner 14 may be referred to as a prefilter.

In the intake passage 52, an intake port of the cylinder head 48, a throttle body 54, the first air cleaner 12, and the second air cleaner 14 are positioned in order from the downstream side to the upstream side in the intake flow direction, and a part of the intake passage 52 is defined and formed by each of them. The throttle body 54 and the first air cleaner 12 are connected by first intake pipes 56 which are intake pipe members, the first air cleaner 12 and the second air cleaner 14 are connected by a second intake pipe 58, and the second air cleaner 14 has an air intake 14a for taking in outside air.

The first air cleaner 12 and the second air cleaner 14 may be mechanically and directly connected to each other, or may be integrally formed from the beginning. In a case where the first air cleaner 12 and the second air cleaner 14 are integrally formed from the beginning, the number of components can be reduced and the component cost can be reduced.

According to the present embodiment, the engine body B includes two cylinders, and includes the first intake pipes 56 for each cylinder as illustrated in FIGS. 3 and 4. In other words, each of the two first intake pipes 56 is connected to the first air cleaner 12. The first intake pipe 56 includes a bellows-shaped pipe portion 56b having a bellows structure, but may not have a bellows structure. The second intake pipe 58, which is an intake pipe member connecting the first air cleaner 12 and the second air cleaner 14, may also include a bellows-shaped pipe portion.

The first intake pipe 56 connected to the upper left side of the cylinder head 48 of the engine body B extend upward and are connected to the first air cleaner 12 positioned above, here, directly above the engine body B. The first air cleaner 12 includes a dirty side 12a located on the upstream side in the intake flow direction and a clean side 12b located on the downstream side in the intake flow direction, and the dirty side 12a and the clean side 12b are partitioned by an air cleaner element 12c. In the first air cleaner 12, the dirty side 12a is located on the outer periphery and the lower side of the substantially cylindrical air cleaner element 12c. In particular, here, as illustrated in FIGS. 2 and 3, the air cleaner element 12c is provided so that the dirty side 12a spreads on the lower side of the air cleaner element 12c. The clean side 12b is located on the left side of the air cleaner element 12c. The clean side 12b extends downward to the left side of the dirty side 12a. Accordingly, the first air cleaner 12 is disposed such that the dirty side 12a and the clean side 12b are arranged side by side in the vehicle width direction. Upstream ends 56a of the first intake pipes 56 are inserted into the clean side 12b of the first air cleaner 12 from the lower side to the upper side (see FIG. 3, for example).

The second air cleaner 14 is disposed on the right side of the first air cleaner 12. The second intake pipe 58 connected to the downstream side of the second air cleaner 14 extends inward in the vehicle width direction and is connected to the first air cleaner 12. Here, a downstream end 58a of the second intake pipe 58 is inserted into the dirty side 12a of the first air cleaner 12. The second intake pipe 58 extends between and connects the first air cleaner 12 and the second air cleaner 14 while being slightly inclined in the vertical direction and the front-rear direction. As illustrated in FIGS. 2 and 3, the second air cleaner 14 is disposed at a position slightly higher than the first air cleaner 12. As illustrated in FIGS. 2 and 5, the second air cleaner 14 is disposed immediately behind the right-side center pillar 36 and at a position not reaching the outside of the center pillar 36, and is positioned inside the frame 16. The second air cleaner 14 may be fixed to the center pillar 36 using a connecting member or the like, for example.

The second air cleaner 14 is a box-shaped member, defines and forms a passage expansion portion in the intake passage 52, and has a cross-sectional area larger than the flow path cross-sectional area of the air intake 14a and the flow path cross-sectional area of a downstream connection portion 14b that is a connection portion with the second intake pipe 58. Therefore, the second air cleaner 14 can exhibit a function of separating sand, dust, and the like contained in the intake air flowing into the second air cleaner. The second air cleaner 14 may include an air cleaner element.

As illustrated in FIG. 2, the center plane CF intersects with the first air cleaner 12. Accordingly, at least a part of the first air cleaner 12 is located at the center in the vehicle width direction. As described above, the first air cleaner 12 is located above the engine body B of the internal combustion engine E. In addition, the first air cleaner 12 is located below the cross pipe 40, here, directly below the cross pipe 40. As apparent from FIGS. 2 and 5, at least a part of the first air cleaner 12 overlaps the cross pipe 40 as a reinforcing frame portion in the vehicle front-rear direction.

The second air cleaner 14 is located on the side of the first air cleaner 12, and is arranged side by side on the right side in this example. Since the center plane CF intersects with the first air cleaner 12, the second air cleaner 14 is positioned outside the first air cleaner 12 in the vehicle width direction.

However, the second air cleaner 14 is disposed inside the frame 16, particularly inside the center pillar 36 of the upper frame portion 32 constituting the outer frame of the vehicle 10 in the frame 16. As apparent from FIG. 2, the second air cleaner 14 is disposed outside the engine body B in the vehicle width direction. Since the second air cleaner 14 is disposed on the right side of the first air cleaner 12 as described above, at least a part of the second air cleaner 14, particularly most of the second air cleaner 14 overlaps with the first air cleaner 12 in the vehicle front-rear direction (see FIG. 5).

Next, the exhaust device ED connected to the engine body B of the internal combustion engine E will be described. As illustrated in FIG. 4, the exhaust device ED includes a chamber (hereinafter, a first chamber) 68 provided in an exhaust passage 64 extending from the engine body B, and a chamber (hereinafter, a second chamber) 74 provided on the downstream side of the first chamber 68 in the exhaust passage 64. Each of the first chamber 68 and the second chamber 74 defines and forms a part of the exhaust passage 64, and the same applies to an exhaust pipe 66 and the like described later. Here, the first chamber 68 includes a catalyst and is configured to function as an emission control device, and the second chamber 74 on the downstream side of the first chamber 68 in the exhaust flow direction is configured to function as a silencer, that is, a muffler. As shown, the first chamber has a larger diameter than those of the first and second exhaust pipes described later. However, the number of chambers provided in the exhaust device ED, the use thereof, and the configuration thereof are not limited thereto.

As described above, the engine body B has two cylinders, and as illustrated in FIGS. 3 and 4, the exhaust pipe 66 connected to the engine body B has two upstream connection portions 66a corresponding to the cylinders of the engine body B. The exhaust pipe 66 includes the two upstream connection portions 66a each of which is a branch pipe portion 66b, and one downstream connection portion 66d which is a downstream common pipe portion 66c where the branch pipe portion 66b merges. The exhaust pipe 66 is connected to the first chamber 68.

As illustrated in FIGS. 8A and 8B, the first chamber 68 has an upstream connection portion 68a and a downstream connection portion 68b. The first chamber 68 includes a tank 68c having a cylindrical shape with both ends closed, and further includes the upstream connection portion 68a and the downstream connection portion 68b on one end surface 68d side of the tank 68c. The upstream connection portion 68a is a pipe portion extending from the end surface 68d of the tank 68c substantially parallel to the central axis 68x of the first chamber 68. The upstream connection portion 68a is connected to the downstream connection portion 66d of the downstream common pipe portion 66c of the exhaust pipe 66 by using a joint (hereinafter, a first joint) 70. Here, the first joint 70 is a flex joint. On the other hand, the downstream connection portion 68b is a pipe portion which extends from the end surface 68d of the tank 68c substantially parallel to the central axis 68x of the first chamber 68, is bent in a direction substantially opposite to the upstream connection portion 68a, and extends in a direction substantially orthogonal to the central axis 68x. The downstream connection portion 68b is connected to an upstream connection portion 74a of the second chamber 74, which is a chamber different from the first chamber 68, by using a joint (hereinafter, a second joint) 72. Since the second joint 72 is not a flex joint but is a joint of a type different from that of the first joint 70, a joint portion 70j formed by the first joint 70 and a joint portion 72j formed by the second joint 72 are joint portions of different types.

The second chamber 74 includes a tank 74b having a cylindrical shape with both ends closed, and further includes the upstream connection portion 74a and an exhaust outlet portion 74e. The upstream connection portion 74a described above is a pipe portion that extends from one end surface 74c of the tank 74b substantially parallel to the central axis 74x of the tank 74b, bends, and extends in a direction substantially orthogonal to the central axis 74x. The exhaust outlet portion 74e is a pipe extending from other end surface 74d of tank 74b of the second chamber 74. As described above, the upstream connection portion 74a is connected to the downstream connection portion 68b of the first chamber 68 by using the second joint 72.

The exhaust pipe 66 connected to the lower right portion side of the cylinder head 48 of the engine body B extends downward, bends, and extends rearward. Then, the exhaust pipe 66 is connected to the first chamber 68 located below the cylinder head 48 from the front lower side (see FIGS. 2 and 4). As illustrated in FIGS. 8A and 8B, on the end surface 68d of the first chamber 68, the downstream connection portion 68b extends from a position obliquely upward and rearward with respect to the upstream connection portion 68a, bends, and extends rearward. Here, since the tank 74b of the second chamber 74 has substantially the same shape and dimension as those of the tank 68c of the first chamber 68 and is located slightly above the tank 68c, the downstream connection portion 68b is slightly inclined so as to be located higher toward the downstream side thereof and extends rearward, and is connected to the upstream connection portion 74a of the second chamber 74. The upstream connection portion 74a extends from the upper portion of the end surface 74c of the second chamber 74, extends forward with a slight inclination so as to be positioned downward toward the upstream side, and is connected to the downstream connection portion 68b of the first chamber 68. As illustrated in FIGS. 2 and 8A, the exhaust outlet portion 74e extending from the end surface 74d at an opposite side of the end surface 74c of the second chamber 74 extends so as to open obliquely downward and rearward.

Here, FIG. 9 is referred. FIG. 9 is a rear view of the portion of the engine body B of the internal combustion engine E mounted on the vehicle 10 as viewed from the rear side in the vehicle front-rear direction, and is a view illustrating an outline 68o of the first chamber 68 and an outline 74o of the second chamber 74 in the vehicle 10 in an overlapping manner with the internal combustion engine E. FIG. 9 further illustrates a predetermined area PA defined behind the engine body B in the vehicle front-rear direction. The predetermined area PA is an area defined by a width W in the vehicle width direction and a width H in the height direction of the engine body B. In particular, in FIG. 9, the predetermined area PA is a quadrangular area including an outer surface 50a of the cylinder head cover 50 and an area (accommodation area) 47s of an accommodation portion that accommodates the outline of the accommodation portion of the crankshaft, that is, the rotating crankshaft in the crankcase, and having four sides extending in the vehicle width direction and the height direction. As is clear from FIG. 9, the outline 68o of the first chamber 68 and the outline 74o of the second chamber 74 partially overlap the predetermined area PA. In particular, the crankshaft axis 47 is located within the outline 68o of the first chamber 68, and the crankshaft axis 47 is located within the outline 74o of the second chamber 74. Therefore, with respect to the first chamber 68 and the second chamber 74 located behind the engine body B, at least a part of the first chamber 68 overlaps the engine body B in the vehicle width direction and the height direction, and at least a part of the second chamber 74 also overlaps the engine body B in the vehicle width direction and the height direction.

Here, FIG. 6 is referred. FIG. 6 is a top view around the rear frame portion 28, and illustrates a part of the exhaust device ED. FIG. 6 illustrates the above-described center plane CF that passes through substantially the center of the vehicle 10 in the vehicle width direction, is orthogonal to the vehicle width direction, extends in the front-rear direction, and extends in the vertical direction.

As is clear from FIG. 6, both the first chamber 68 and the second chamber 74 are biased to one side of the center plane CF, the left side in this example. In other words, the first chamber 68, particularly the tank 68c thereof, is disposed to be biased to one side in the vehicle width direction, and the second chamber 74, particularly the tank 74b thereof, is disposed to be biased to the same side as the side on which the first chamber 68 is biased, that is the left side in this example, in the vehicle width direction.

Further, as is apparent from FIG. 6, an exhaust pipe (hereinafter, a first exhaust pipe) 67a formed by connecting the exhaust pipe, that is, the exhaust pipe 66 and the upstream connection portion 68a extending between the engine body B and the first chamber 68, particularly the tank 68c thereof, and an exhaust pipe (hereinafter, a second exhaust pipe) 67b formed by connecting the exhaust pipe, that is, the downstream connection portion 68b and the upstream connection portion 74a extending between the first chamber 68, particularly the tank 68c thereof, and the second chamber 74, particularly the tank 74b thereof, extend on the same side in the vehicle width direction. In this example, the first exhaust pipe 67a and the second exhaust pipe 67b extend in the right side of the center plane CF.

As illustrated in FIG. 7, the rear frame portion 28 includes an upper rear frame portion 28u on the upper side and a lower rear frame portion 28d on the lower side, and includes a support frame portion 28s extending in the vertical direction, that is, the height direction, and connecting the upper rear frame portion 28u and the lower rear frame portion 28d. Regarding the rear frame portion 28, the first chamber 68 and the second chamber 74 are disposed in the rear frame portion 28. In other words, the first chamber 68 and the second chamber 74 are disposed below the upper end portion of the rear frame portion 28, that is, below the upper rear frame portion 28u. The first chamber 68 and the second chamber 74 are disposed above the lower end of rear frame portion 28, that is, above the lower rear frame portion 28d. The cargo bed 24 is provided at the upper end portion of the rear frame portion 28, that is, above the upper rear frame portion 28u.

According to the vehicle 10 having the above configuration, the following functions and effects are achieved.

In the vehicle 10, at least a part of the engine body B of the internal combustion engine E is positioned at the center in the vehicle width direction, the first chamber 68 is provided in the exhaust passage 64 extending from the engine body B, and the second chamber 74 is provided on the downstream side of the first chamber 68 in the exhaust passage 64. The first chamber 68 and the second chamber 74 are positioned behind the engine body B, and at least a part of the first chamber 68 and at least a part of the second chamber 74 overlap the engine body B in the vehicle width direction and the height direction, respectively. According to this configuration, the arrangement area of the first chamber 68 and the second chamber 74 can be limited to an area behind the engine body B and at least partially hidden by the engine body B. With this configuration, here, it is possible to prevent the lengths of both the first exhaust pipe 67a extending between the engine body B and the first chamber 68 and the second exhaust pipe 67b extending between the first chamber 68 and the second chamber 74 from becoming unnecessarily long, and thus, it is possible to make the exhaust system of the internal combustion engine E compact. In this manner, the vehicle 10 can provide a novel arrangement that can contribute to the downsizing of the exhaust system of the internal combustion engine E in the vehicle 10 that is frequently used on an uneven ground.

In addition, the first chamber 68 is disposed to be biased to one side in the vehicle width direction, and the second chamber 74 is disposed to be biased to the same side as the side on which the first chamber 68 is biased in the vehicle width direction. Therefore, the first chamber 68 and the second chamber 74 can be biased in the same direction in the vehicle width direction, so that the chambers 68 and 74 can be compactly disposed in the vehicle 10.

Further, the first exhaust pipe 67a extending between the engine body B and the first chamber 68 and the second exhaust pipe 67b extending between the first chamber 68 and the second chamber 74 extend on the same side in the vehicle width direction. Therefore, here, the first exhaust pipe 67a and the second exhaust pipe 67b can be made compact both in length and arrangement space.

Further, the first chamber 68 and the second chamber 74 are disposed below the upper rear frame portion 28u which is the upper end portion of the rear frame portion 28 of the vehicle body frame 16 supporting the cargo bed 24 provided on the rear side of the seat 22 with the engine body B substantially interposed therebetween. As a result, the exhaust system of the internal combustion engine E can be disposed substantially compactly below the cargo bed 24.

In addition, the exhaust gas of the internal combustion engine E has a high temperature, and the exhaust system is likely to have a high temperature. By disposing the chambers 68 and 74 under the cargo bed 24 in this manner, it is possible to suppress the occupant sitting on the seat 22 from being affected by the heat of the exhaust system.

In the internal combustion engine E of the vehicle 10, the joint portion 70j formed by the first joint 70 is provided in the first exhaust pipe 67a extending between the engine body B and the first chamber 68, and the joint portion 72j formed by the second joint 72 is provided in the second exhaust pipe 67b extending between the first chamber 68 and the second chamber 74. According to this configuration, in the middle of each of the exhaust pipes 67a and 67b, for example, a part of vibration transmitted from the engine body can be absorbed by the joint portions 70j and 72j, whereby generation of abnormal noise from the exhaust system can be prevented and durability of the exhaust system component can be improved.

Further, the first exhaust pipe 67a extending between the engine body B and the first chamber 68 and the second exhaust pipe 67b extending between the first chamber 68 and the second chamber 74 have joint portions 70j and 72j of different types. According to this configuration, the different types of joint portions 70j and 72j further easily absorb vibration transmitted from the engine body to each exhaust pipe, and thus, it is possible to prevent generation of abnormal noise and enhance durability of each exhaust system component.

Figure 10:
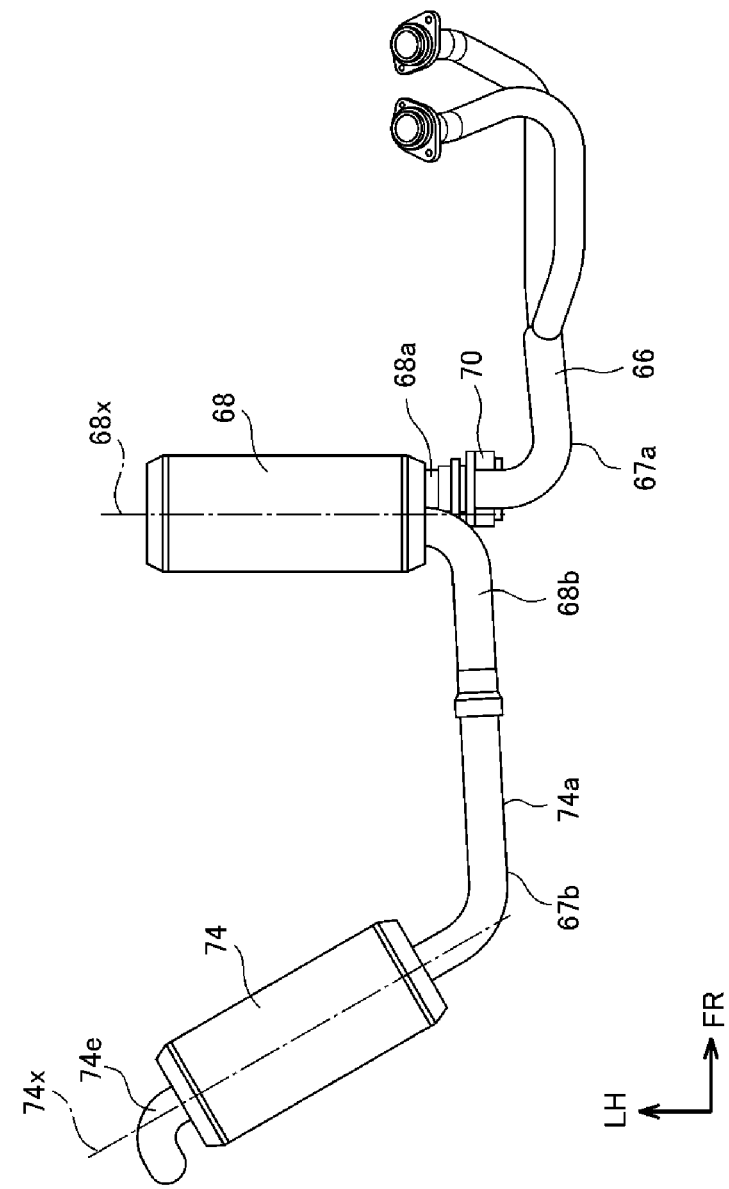
FIG. 10 is a top view illustrating a modification of the exhaust system in the internal combustion engine of the vehicle in FIG. 1.
Figure 11:
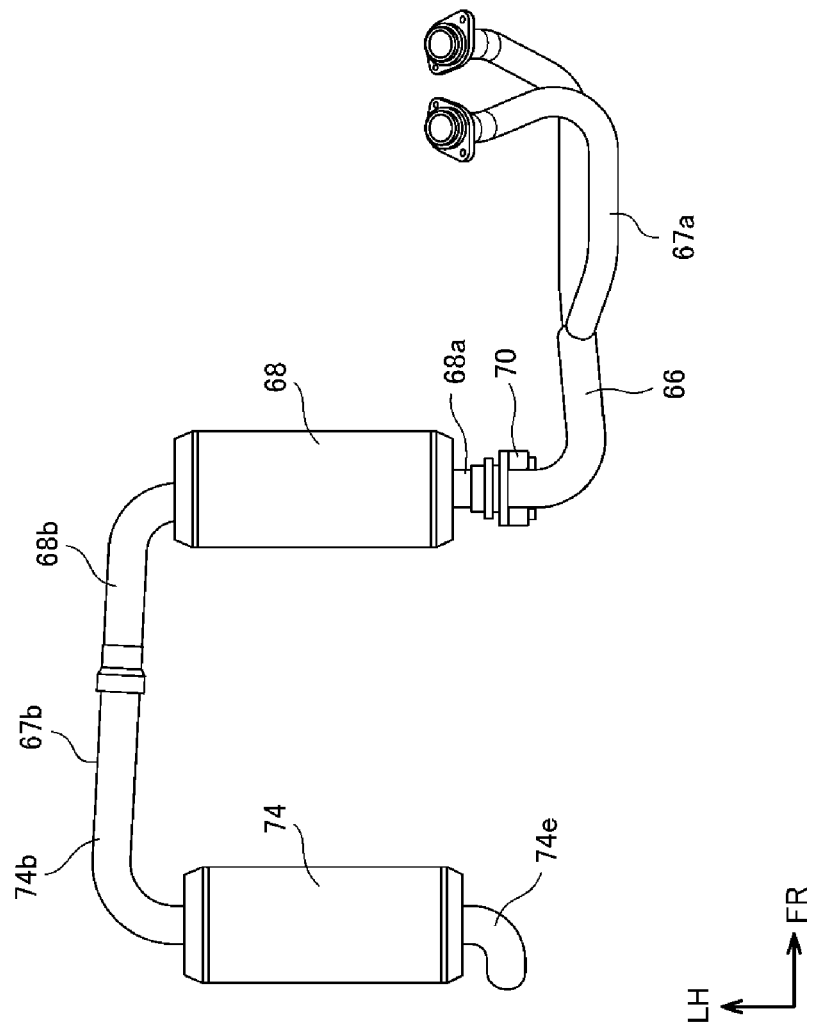
FIG. 11 is a top view illustrating another modification of the exhaust system in the internal combustion engine of the vehicle in FIG. 1.

Although the vehicle 10 having the above configuration has been described above, the present invention is not limited to the above description. For example, in the exhaust device ED of the internal combustion engine E of the vehicle 10, the first chamber 68, and the second chamber 74 are disposed such that the axes 68x and 74x extend in parallel in the vehicle width direction. However, at least one of the chambers, more specifically, the axis extending in the longitudinal direction of at least one of the chambers may be inclined with respect to the vehicle width direction. FIG. 10 illustrates a modification of the exhaust device having a configuration in which the axis 68x extending in the longitudinal direction of the first chamber 68 is parallel to the vehicle width direction (corresponding to the LH direction), and the axis 74x extending in the longitudinal direction of the second chamber 74 is inclined with respect to the vehicle width direction. Further, in the exhaust device ED of the internal combustion engine E of the vehicle 10, the first exhaust pipe 67a extending between the engine body B and the first chamber 68 and the second exhaust pipe 67b connecting the first chamber 68 and the second chamber 74 are provided on the same side in the vehicle width direction. However, these exhaust pipes 67a and 67b may be disposed on different sides. FIG. 11 illustrates an example of an exhaust device having a configuration in which the exhaust pipes 67a and 67b are disposed on different sides in the vehicle width direction.

As described above, in the internal combustion engine E of the vehicle 10, the first joint 70 that is a flex joint is used as the joint portion 70j of the first exhaust pipe 67a extending between the engine body B and the first chamber 68. In the first joint 70, since the flex joint is used for both the connection targets, vibration can be further absorbed, so that the strength of the pipe to which the joint is connected can be increased. However, in the case of using a flex joint, since parts such as bolts for fixing the joint are required and the number of parts increases, one may be a flex joint and the other joint may be an insertion type (fitting type) normal joint other than the flex joint. In this case, the number of parts can be reduced. Note that the present disclosure does not exclude the use of the same type and the same combination of joints for the first joint 70 and the second joint 72.

The embodiment of the present invention and the modified example thereof have been described above, but the present invention is not limited thereto. Various substitutions and changes may be made without departing from the spirit and scope of the present invention as defined by the claims of the present application. The processing and means described in the present disclosure can be freely combined and implemented as long as no technical contradiction occurs.

REFERENCE SIGNS LIST

10 Vehicle
12 First air cleaner
14 Second air cleaner
16 Vehicle body frame
36 Center pillar
40 Cross pipe
68 First chamber
74 Second chamber

The invention claimed is:

1. A vehicle that has an internal combustion engine, the vehicle comprising:
   an engine body at least partially located at a center in a vehicle width direction; and
   an exhaust system,
   the exhaust system comprising:
   branch pipe portions each extending from a corresponding cylinder of the engine body;
   a downstream common pipe portion where the branch pipe portions merge;
   a first exhaust pipe connected to a downstream side of the downstream common pipe portion;
   a first chamber provided to a downstream side of the first exhaust pipe in an exhaust passage; and
   a second chamber provided downstream of the first chamber in the exhaust passage; and
   a second exhaust pipe extending between the first chamber and the second chamber,
   wherein
   the first chamber has a larger diameter than those of the first and second exhaust pipes, and is located behind the engine body in a vehicle longitudinal direction,
   at least a part of the first chamber and at least a part of the second chamber overlapping the engine body in a vehicle width direction and a height direction, respectively,
   the first chamber being provided with an upstream connection portion to which the first exhaust pipe is connected and a downstream connection portion to which the second exhaust pipe is connected on one end surface of the second exhaust pipe, and
   both the first exhaust pipe and the second exhaust pipe are on either a right side or a left side of center in the vehicle width direction.

2. The vehicle according to claim 1, wherein
the first chamber is disposed to be biased to one side in the vehicle width direction, and
the second chamber is disposed to be biased to the same side as the side where the first chamber is biased in the vehicle width direction.

3. The vehicle according to claim 1, wherein
a seat is provided in front of the engine body as viewed in a side direction of the vehicle,
a cargo bed is provided behind the engine body as viewed in the side direction of the vehicle, and
the first chamber and the second chamber are disposed below an upper end portion of a rear frame portion of a vehicle body frame as viewed in the side direction of the vehicle, the upper end portion supporting the cargo bed.

4. The vehicle according to claim 1, wherein
the first exhaust pipe extending between the engine body and the first chamber has at least one joint portion, and
the second exhaust pipe extending between the first chamber and the second chamber has at least one joint portion.

5. The vehicle according to claim 1, wherein
joint portions of different types are provided in the first exhaust pipe extending between the engine body and the first chamber and the second exhaust pipe extending between the first chamber and the second chamber.

6. The vehicle according to claim 1, wherein the first chamber includes a catalyst and is configured to function as an emission control device.

* * * * *